US012748233B2

(12) United States Patent
Rojas et al.

(10) Patent No.: US 12,748,233 B2
(45) Date of Patent: Sep. 29, 2026

(54) INDUCTIVE SENSOR-BASED BATTERY PRESENCE DETECTION IN DEVICE ENCLOSURES AND RELATED METHODS

(71) Applicant: DISH Network L.L.C., Englewood, CO (US)

(72) Inventors: Angel Rojas, El Paso, TX (US); Armando Menchaca Palacios, El Paso, TX (US); Juan E. Apodaca, El Paso, TX (US); Sean Pichardo, El Paso, TX (US); Joel Cardoso, El Paso, TX (US)

(73) Assignee: DISH Network L.L.C., Englewood, CO (US)

( * ) Notice: Subject to any disclaimer, the term of this patent is extended or adjusted under 35 U.S.C. 154(b) by 215 days.

(21) Appl. No.: 18/364,976

(22) Filed: Aug. 3, 2023

(65) Prior Publication Data

US 2025/0044475 A1 Feb. 6, 2025

(51) Int. Cl.
*G01V 3/10* (2006.01)

(52) U.S. Cl.
CPC .................................... *G01V 3/10* (2013.01)

(58) Field of Classification Search
None
See application file for complete search history.

(56) References Cited

U.S. PATENT DOCUMENTS

2008/0111545 A1* 5/2008 Crowley ................ G01V 3/101
324/234
2017/0314967 A1* 11/2017 Olsen ..................... G01D 5/142
2018/0076671 A1* 3/2018 Chopra ................... H02J 50/60
2018/0121643 A1* 5/2018 Talwerdi ................ G07C 9/257
2018/0337557 A1* 11/2018 Chen ....................... H02J 50/90
2019/0293827 A1* 9/2019 Widmer .................. B60L 50/66
2020/0312119 A1* 10/2020 Cai ......................... B25J 9/1676

* cited by examiner

*Primary Examiner* — Nasima Monsur
(74) *Attorney, Agent, or Firm* — Capitol City TechLaw; Jasbir Singh

(57) ABSTRACT

A battery presence detector designed to detect the presence of batteries in a device enclosure without the need to open the enclosure is described. The detection process involves the use of an inductive sensor to sample an interaction value triggered by the presence of the battery within the device. The devices to be checked for battery presence may be placed on a conveyor. The detector may be used with a mechanism for separating the devices based on whether or not a battery is present within them. Examples of devices to be tested include remote controls and cell phones.

20 Claims, 2 Drawing Sheets

INDUCTIVE SENSOR-BASED BATTERY PRESENCE DETECTION IN DEVICE ENCLOSURES AND RELATED METHODS

FIELD

A battery presence detector to detect presence of batteries in a device enclosure without opening the enclosure. The detection uses an inductive sensor to sample an interaction value derived from a galvanized current response caused by a presence of the battery. The devices may be placed on a conveyor in alignment and with an obverse surface of the device facing the inductive senor. The devices are separated based on the presence of a battery. These teachings are applicable to a variety of devices that include a removable battery. Examples of such devices include, but are not limited to, remote controls and cell phones.

BACKGROUND

In the modern world, electronic devices are ubiquitous. These devices, ranging from remote controls to cell phones, often rely on removable batteries as their power source. The presence of a battery in these devices is crucial for their operation. However, determining whether a battery is present in a device often requires opening the device enclosure, which can be time-consuming and may potentially damage the device.

The traditional method of battery detection involves physical inspection, which is not only labor-intensive but also prone to human error. This method is particularly inefficient when dealing with a large number of devices, as is often the case in manufacturing or recycling facilities that may intake thousands of devices per day. For example, a DISH equipment facility may intake upwards of 13K devices such as remotes per day. Devices for recycling, remanufacturing or the like may be shipped overseas or across state lines. In some instances, shipment of devices with the batteries embedded therein is prohibited and the batteries need to be removed prior to shipment. At times up to 50% of devices may be received at the equipment facility with batteries therein. By only opening 50% of the received devices, significant labor savings can be realized.

Furthermore, the process of opening the device enclosure to check for battery presence can potentially lead to damage, especially in devices with delicate or complex structures.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In one embodiment, the present teachings include a battery presence detector designed to detect the presence of batteries in a device enclosure without the need to open the enclosure. In some embodiments, the detection process involves the use of an inductive sensor. This sensor is used to sample an interaction value, which is derived from a galvanized current response. This response is triggered by the presence of the battery within the device.

In some embodiments, the devices to be checked for battery presence may be placed on a conveyor. The alignment of these devices is such that the obverse surface of each device faces the inductive sensor. The present teachings may include a mechanism for separating the devices based on whether or not a battery is present within them. The teachings are applicable to a variety of devices that include a removable battery. Examples of such devices include, but are not limited to, remote controls and cell phones.

In some aspects, the techniques described herein relate to a method for detecting a battery presence in a device enclosure, the method including: sampling an interaction value derived from a galvanized current response caused by the presence of a battery within the device enclosure using an inductive sensor; and classifying the device enclosure as one of a battery-containing device enclosure and a battery-lacking device enclosure by comparing the interaction value with a predetermined value.

In some aspects, the techniques described herein relate to a method, wherein the device enclosure is part of a device selected from a group consisting of a remote control, a portable communication device, and a portable storage device.

In some aspects, the techniques described herein relate to a method, wherein the device enclosure includes device enclosures of two or more lengths.

In some aspects, the techniques described herein relate to a method, further including flipping the device enclosure when an obverse surface of the device enclosure is facing away from the inductive sensor.

In some aspects, the techniques described herein relate to a method, further including diverting the battery-lacking device enclosure to a non-inspection path.

In some aspects, the techniques described herein relate to a method, wherein the interaction value is sampled without opening the device enclosure.

In some aspects, the techniques described herein relate to a method, wherein the interaction value is sampled at a predetermined frequency.

In some aspects, the techniques described herein relate to a method, further including aligning the device enclosure with the inductive sensor using a conveyor.

In some aspects, the techniques described herein relate to a method, further includes adjusting the predetermined value based on one or more of a conveyor velocity or a length of the device enclosure.

In some aspects, the techniques described herein relate to a method, further including detecting a device presence in a measurement zone of the conveyor prior to the sampling.

In some aspects, the techniques described herein relate to a method, further including disabling the sampling when the device presence is not detected or the device presence exceeds a predetermined duration.

In some aspects, the techniques described herein relate to a method for detecting a battery presence in a device enclosure, the method including: aligning the device enclosure over a measurement zone of a conveyor; flipping the device enclosure when an obverse surface of the device enclosure is facing away from an inductive sensor in the measurement zone; sampling an interaction value derived from a galvanized current response caused by the presence of a battery within the device enclosure using the inductive sensor; classifying the device enclosure as one of a battery-containing device enclosure and a battery-lacking device enclosure by comparing the interaction value with a predetermined value; and diverting the battery-lacking device enclosure to a non-inspection path, wherein the flipping is performed prior to the sampling.

In some aspects, the techniques described herein relate to a system to detect a battery presence in a device enclosure, the system including: an inductive sensor to sample an interaction value derived from a galvanized current response caused by the presence of a battery within the device enclosure; and a controller to classify the device enclosure as one of a battery-containing device enclosure and a battery-lacking device enclosure by comparing the interaction value with a predetermined value.

In some aspects, the techniques described herein relate to a system, further including a conveyor to position the device enclosure over a measurement zone of the conveyor; and a presence detector to detect a device presence in the measurement zone.

In some aspects, the techniques described herein relate to a system, wherein the controller flips the device enclosure when an obverse surface of the device enclosure is facing away from the inductive sensor.

In some aspects, the techniques described herein relate to a system, wherein the device enclosure includes device enclosures of two or more lengths.

In some aspects, the techniques described herein relate to a system, wherein the controller diverts the battery-lacking device enclosure to a non-inspection path.

Additional features will be set forth in the description that follows, and in part will be apparent from the description, or may be learned by practice of what is described.

BRIEF DESCRIPTION OF DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
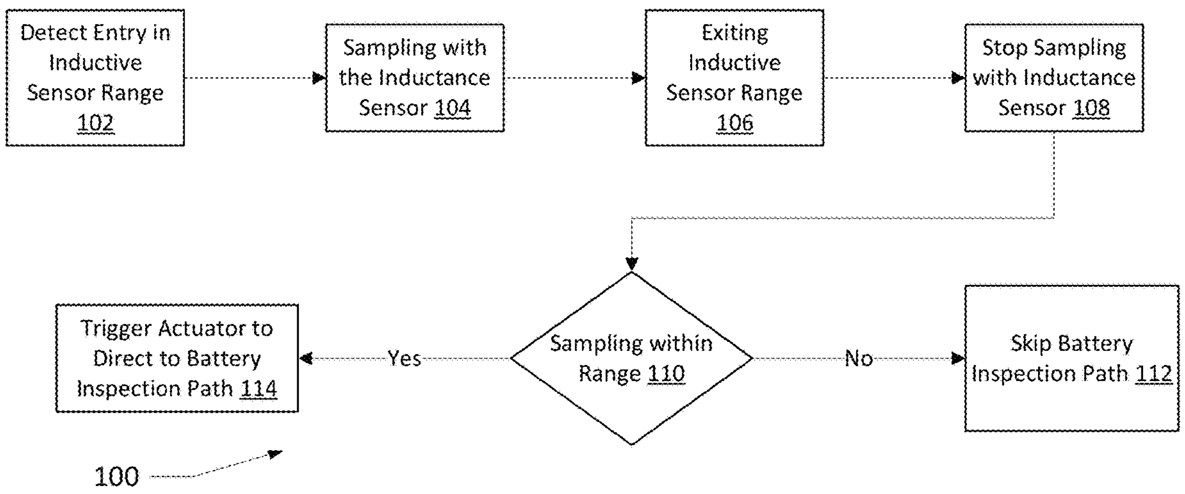
FIG. 1 illustrates a method for detecting a battery presence in a device enclosure according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings introduce a battery presence detector that uses an inductive sensor to sample an interaction value from a galvanized current response caused by the presence of the battery. This method allows for the detection of battery presence without the need to open the device enclosure, thereby improving efficiency and reducing the risk of damage. Devices may be placed on a conveyor in alignment, with an obverse surface of the device facing the inductive sensor. The devices may be separated based on the presence of a battery. This system is particularly beneficial in settings where a large number of devices need to be inspected, such as in manufacturing or recycling facilities.

As such, a solution to the challenges associated with traditional methods of battery detection is provided. By using an inductive sensor to detect the presence of batteries in a device enclosure, the present teachings improve efficiency, reduce the risk of damage, and eliminate the need for physical inspection. Determining a presence or absence of batteries in a device without opening the device results significant labor savings when substantial number of devices need to be handled daily.

FIG. 1 illustrates a method for detecting a battery presence in a device enclosure according to various embodiments.

A method 100 for detecting a battery presence in a device enclosure may include operation 102 for detecting entry of a device in an inductive sensor range. The method 100 may include operation 104 for sampling an interaction of an inductive sensor with the device. The method 100 may include operation 106 for determining that the device has exited the measurement zone. The method 100 may operation 108 for stopping the sampling of the interaction with the inductive sensor after the device has exited the measurement zone. The method 100 may include an operation 110 for determining a battery presence in the device as the sampling provided an interaction value within a range. The method 100 may include operation 112 for skipping a battery inspection path when operation 110 indicated no battery presence in the device. The method 100 may include operation 114 for triggering an actuator for directing the device to a battery inspection path when operation 112 indicated battery presence in the device.

Figure 2:
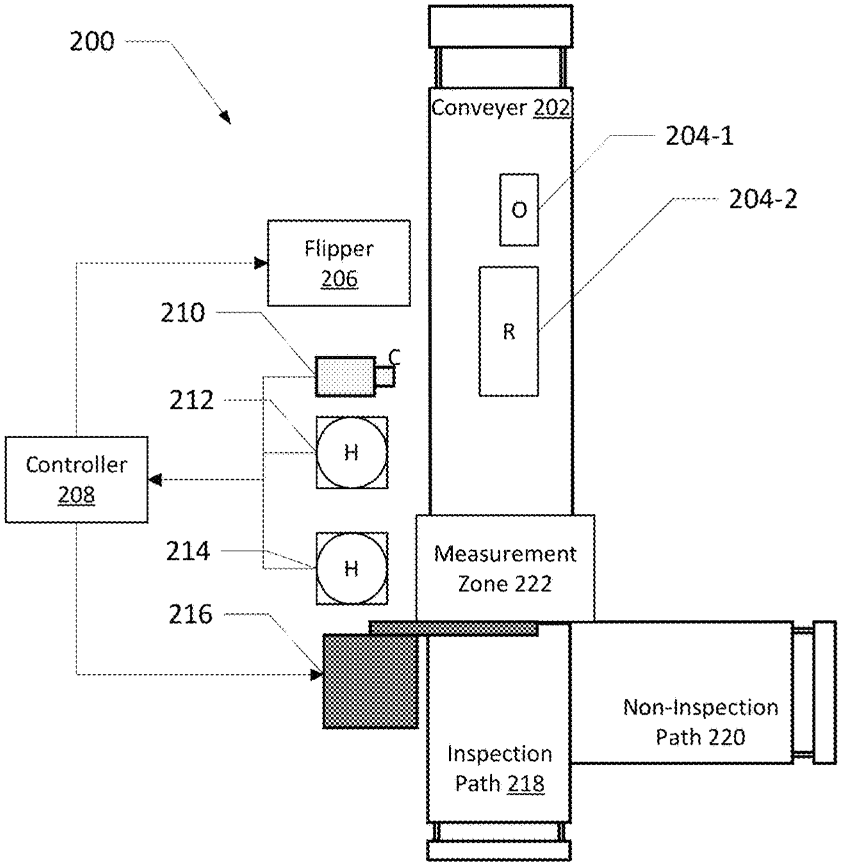
FIG. 2 is a logical diagram of a system to detect a battery presence in a device, according to various embodiments.

FIG. 2 is a logical diagram of a system to detect a battery presence in a device, according to various embodiments.

A battery inspection system ("system 200") may include a conveyor 202 to convey devices 204 (device 204-1, device 204-2) to be tested. The system 200 may include a flipper 206, a camera 210 to support flipper 206, a presence detector 212, an inductive sensor 214, a measurement zone 222, an actuator 216, an inspection path 218, a non-inspection path 220, and a controller 208. The controller 208 may implement a logic of method 100 and/or method 300 (described below).

Devices 204 may have a casing or housing where a battery is placed. The device enclosure could be any device that includes a removable battery such as a remote control or a cell phone. Devices 204 may be viewed as having two outer surfaces, namely an obverse surface and a reverse surface. The obverse surface is the outer surface of the device having the least metal between it and the battery (when one is present) in the device. The reverse surface is the outer surface of the device having a greater amount of metal between it and the battery as compared to the obverse surface of a respective device.

Conveyor 202 is a platform where devices 204 are placed and moved in alignment for inductive sensor 214 to detect the presence of a battery. Conveyor 202 helps in the efficient and systematic checking of multiple devices. As devices 204 move along conveyor 202, inductive sensor 214 samples an interaction value from the galvanized current response caused by the presence of the battery. Based on this interaction value, system 200 can determine whether a battery is present in the device enclosure or not. Devices 204 are then separated based on the presence of a battery.

In some embodiments, devices 204 may be randomly disposed on either the obverse surface or the reverse surface. For example, device 204-1 is disposed on its obverse surface of a respective device with respect to the conveyor 202 while device 204-2 is disposed on its reverse surface with respect to the conveyor 202. In some embodiments, devices 204 may be flipped so that the obverse surface of a respective device is closest to inductive sensor 214. So when inductive sensor 214 is disposed above conveyor 202, device 204-1 will be flipped by flipper 206, while device 204-2 is not flipped, In contrast when inductive sensor 214 is disposed below conveyor 202, device 204-2 is flipped by flipper 206, while device 204-1 is not flipped. Controller 208 may actuate flipper 206 as necessary by observing devices 204 with camera 210 as they travel on conveyor 202 to ensure a proper outer surface of devices 204 is sensed by inductive sensor 214.

In some embodiments, flipper 206 may be a passive device and as such controller 208 does not actuate flipper 206 or observe devices 204 with camera 210. When flipper 206 is a passive device, flipper 206 may include various wedges, angles, counter angles for different lengths of devices 204. For example, flipper 206 may include an angle or wedge disposed along a rail of conveyer 202 to flip devices 204 that are of a first length, and a counter angle to avoid flipping devices of a second length.

Inductive sensor 214 uses the principle of electromagnetic induction to detect or measure objects. Controller 208 obtains an interaction value derived from a galvanized current response by sampling inductive sensor 214 to when devices 204 are indicated as being present by presence detector 212. In some embodiments, inductive sensor 214 is positioned in such a way that it faces the obverse surface of devices 204.

In inductive sensor 214, without limitation, an inductor develops an alternating magnetic field when an electric current flows through it. A change in the alternating magnetic includes a field oscillation magnitude that is detectable with an amplitude modulation detector, while a frequency change is detectable with a frequency discriminator circuit. Either the magnitude change, or the frequency change define an interaction between the inductive sensor and a proximate item to be sensed. In some embodiments, inductive sensor 214 may have a sensing range of 0-40 mm where the interaction is provided as an analog output having a current ranging from 4-20 mA and a voltage ranging from 0-10 V. One such inductance sensor is the IMA30-40NE1ZC0K inductive sensor.

Controller 208 samples the interaction values while one of the devices 204 traverses measurement zone 222 on conveyor 202. A velocity of conveyor 202 may be used to adjust a range of interaction values that indicate battery presence. Controller 208 may use the battery presence indicator to trigger actuator 216 to select either inspection path 218 or non-inspection path 220 for the tested device. One such actuator is the SMC CXSM10-75 actuator that may be disposed immediately past measurement zone 222 along conveyer 202.

In some embodiments, a reflective tape may be used to define measurement zone 222. Presence detector 212 may be aimed at measurement zone 222. Presence detector 212 may display a green light to indicate power. Presence detector 212 may display an amber light to indicate that it is detecting a presence in measurement zone 222, for example, devices 204 such as a remote control in measurement zone 222. In some embodiments, presence detector 212 may be disposed 0.3 to 2 inches or more from a surface conveying the devices to be detected for battery presence. Presence detector 212 may be a photo-electric sensor. An exemplary presence detector is detector XUM5APCNM8 from OsiSense XU.

Figure 3:
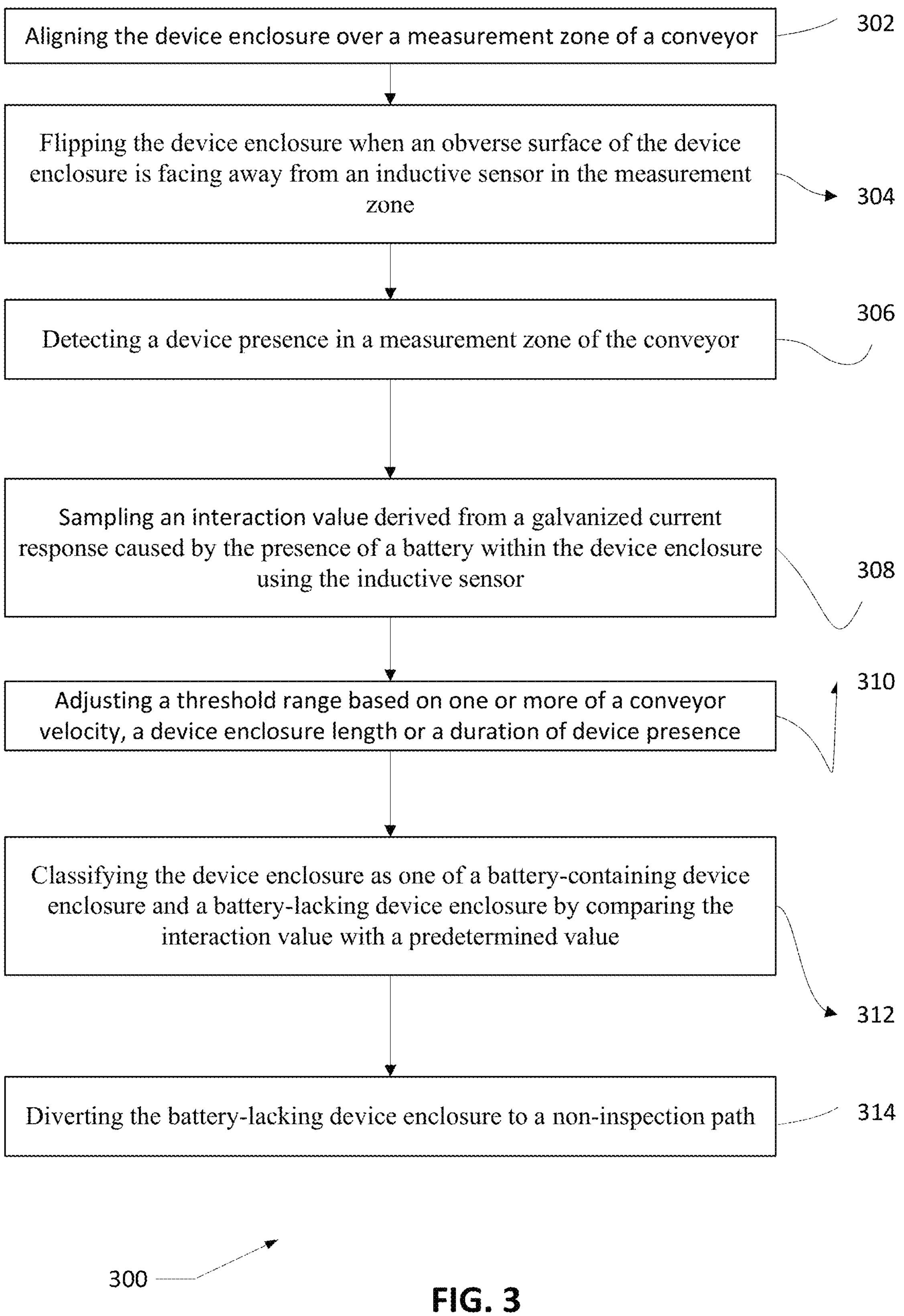
FIG. 3 illustrates a method for detecting a battery presence in a device enclosure according to various embodiments.

FIG. 3 illustrates a method for detecting a battery presence in a device enclosure according to various embodiments.

A method 300 for detecting a battery presence in a device enclosure may include operation 302 for aligning the device enclosure over a measurement zone of a conveyor. The method 300 may include operation 304 for flipping the device enclosure when an obverse surface of the device enclosure is facing away from an inductive sensor in the measurement zone. The method 300 may include operation 306 for detecting a device presence in a measurement zone of the conveyor. The method 300 may include operation 308 for sampling an interaction value derived from a galvanized current response caused by the presence of a battery within the device enclosure using the inductive sensor. The method 300 may include operation 310 for adjusting the predetermined range based on one or more of a conveyor velocity, a length of the device enclosure or a duration of the device presence. The method 300 may include operation 312 for classifying the device enclosure as one of a battery-containing device enclosure and a battery-lacking device enclosure by comparing the interaction value with a predetermined value. The method 300 may operation 314 for diverting the battery-lacking device enclosure to a non-inspection path.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for detecting a battery presence in a device enclosure, the method comprising:

positioning the device enclosure over a measurement zone;

sampling a galvanized current response in an alternating magnetic field of an inductive sensor to derive an interaction value, wherein the galvanized current response is caused by the presence of a galvanized current induced in a battery within the device enclosure; and classifying, with a controller, the device enclosure as one of a battery-containing device enclosure and a battery-lacking device enclosure by comparing the interaction value with a predetermined value, wherein the interaction value comprises a change in at least one of a field oscillation magnitude of the alternating magnetic field or a frequency of the alternating magnetic field sensed by the inductive sensor, wherein the device enclosure comprises outer surfaces comprising an obverse surface and a reverse surface, wherein there is a greater amount of metal between the reverse surface and the battery as compared to an amount of metal between the obverse surface and the battery, and wherein the sampling of the galvanized current response is performed through the obverse surface of the device enclosure positioned within the measurement zone.

2. The method of claim 1, wherein the device enclosure is part of a device selected from a group consisting of: a remote control, a portable communication device, and a portable storage device.

3. The method of claim 1, wherein the battery has a battery length and the device enclosure has a length at least twice the battery length.

4. The method of claim 1, further comprising flipping the device enclosure, prior to the sampling, when the obverse surface of the device enclosure is facing away from the inductive sensor.

5. The method of claim 1, further comprising diverting the battery-lacking device enclosure to a non-inspection path.

6. The method of claim 1, wherein the interaction value is sampled without opening the device enclosure.

7. The method of claim 1, wherein the interaction value is sampled at a predetermined frequency.

8. The method of claim 1, further comprising positioning the device enclosure with the inductive sensor disposed along the measurement zone of a conveyor.

9. The method of claim 8, further comprises adjusting the predetermined value based on one or more of a conveyor velocity or a length of the device enclosure.

10. The method of claim 8, further comprising detecting a device presence in the measurement zone of the conveyor prior to the sampling.

11. The method of claim 10, further comprising disabling the sampling when the device presence is not detected or the device presence exceeds a predetermined duration.

12. A method for detecting a battery presence in a device enclosure, the method comprising:

positioning the device enclosure over a measurement zone disposed along a path of a conveyor;

flipping the device enclosure when an obverse surface of the device enclosure is facing away from an inductive sensor in the measurement zone;

sampling a galvanized current response in an alternating magnetic field of an inductive sensor to derive an interaction value, wherein the galvanized current response is caused by the presence of a galvanized current induced in a battery within the device enclosure;

classifying, with a controller, the device enclosure as one of a battery-containing device enclosure and a battery-lacking device enclosure by comparing the interaction value with a predetermined value; and diverting the battery-lacking device enclosure to a non-inspection path, wherein the interaction value comprises a change in at least one of a field oscillation magnitude of the alternating magnetic field or a frequency of the alternating magnetic field sensed by the inductive sensor, wherein the flipping is performed prior to the sampling, wherein the device enclosure comprises outer surfaces comprising the obverse surface and a reverse surface, wherein there is a greater amount of metal between the reverse surface and the battery as compared to an amount of metal between the obverse surface and the battery, and wherein the sampling of the galvanized current response is performed through the obverse surface of the device enclosure positioned within the measurement zone.

13. The method of claim 12, further comprising detecting a device presence in the measurement zone of the conveyor prior to the sampling.

14. The method of claim 12, wherein the device enclosure is part of a device selected from a group consisting of: a remote control, a portable communication device, and a portable storage device.

15. The method of claim 12, wherein the battery has a battery length and the device enclosure has a length at least twice the battery length.

16. A system to detect a battery presence in a device enclosure, the system comprising:

a measurement zone to position the device enclosure over;

an inductive sensor to sample a galvanized current response in an alternating magnetic field of the inductive sensor to derive an interaction value, wherein the galvanized current response is caused by the presence of a galvanized current induced in a battery within the device enclosure; and a controller to classify the device enclosure as one of a battery-containing device enclosure and a battery-lacking device enclosure by comparing the interaction value with a predetermined value, wherein the interaction value comprises a change in at least one of a field oscillation magnitude of the alternating magnetic field or a frequency of the alternating magnetic field sensed by the inductive sensor, wherein the device enclosure comprises outer surfaces comprising an obverse surface and a reverse surface, wherein there is a greater amount of metal between the reverse surface and the battery as compared to an amount of metal between the obverse surface and the battery, and wherein the sampling of the galvanized current response is performed through the obverse surface of the device enclosure positioned within the measurement zone.

17. The system of claim 16, further comprising a conveyor to position the device enclosure over the measurement zone of the conveyor; and a presence detector to detect a device presence in the measurement zone.

18. The system of claim 16, wherein the controller flips the device enclosure, before the inductive sensor can sample, when the obverse surface of the device enclosure is facing away from the inductive sensor.

19. The system of claim 16, wherein the battery has a battery length and the device enclosure has a length at least twice the battery length.

20. The system of claim 16, wherein the controller diverts the battery-lacking device enclosure to a non-inspection path.

* * * * *